(12) United States Patent
Gehret et al.

(10) Patent No.: US 9,470,126 B2
(45) Date of Patent: Oct. 18, 2016

(54) ASSEMBLY AND METHOD FOR REDUCING AMMONIA IN EXHAUST OF INTERNAL COMBUSTION ENGINES

(71) Applicant: Tecogen Inc., Waltham, MA (US)

(72) Inventors: Joseph B. Gehret, Waltham, MA (US); Robert Panora, Waltham, MA (US); Ranson Roser, Waltham, MA (US); Jean P. Roy, Waltham, MA (US)

(73) Assignee: Tecogen Inc., Waltham, MA (US)

( * ) Notice: Subject to any disclaimer, the term of this patent is extended or adjusted under 35 U.S.C. 154(b) by 0 days.

(21) Appl. No.: 14/721,694

(22) Filed: May 26, 2015

(65) Prior Publication Data
US 2015/0252700 A1 Sep. 10, 2015

Related U.S. Application Data

(63) Continuation-in-part of application No. 14/077,607, filed on Nov. 12, 2013, now Pat. No. 9,121,326, which is a continuation of application No. 12/816,706, filed on Jun. 16, 2010, now Pat. No. 8,578,704.

(60) Provisional application No. 61/343,392, filed on Apr. 28, 2010.

(51) Int. Cl.
*F01N 3/02* (2006.01)
*F01N 3/10* (2006.01)
(Continued)

(52) U.S. Cl.
CPC ............... *F01N 3/0205* (2013.01); *F01N 3/04* (2013.01); *F01N 3/05* (2013.01); *F01N 3/101* (2013.01); *F01N 3/103* (2013.01); *F01N 3/106* (2013.01); *F01N 3/2046* (2013.01); *F01N 3/2066* (2013.01); *F01N 3/2889* (2013.01); *F01N 9/00* (2013.01); *F01N 13/009* (2014.06); *F01N 13/0097* (2014.06); *F23G 7/07* (2013.01); *F23J 15/02* (2013.01); *F23J 15/06* (2013.01); *F01N 3/206* (2013.01); *F01N 3/2892* (2013.01); *F01N 3/34* (2013.01); *F01N 11/002* (2013.01); *F01N 2240/02* (2013.01); *F01N 2240/20* (2013.01); *F01N 2240/36* (2013.01); *F01N 2260/02* (2013.01); *F01N 2270/02* (2013.01); *F01N 2410/02* (2013.01); *F01N 2560/021* (2013.01); *F01N 2560/06* (2013.01); *F01N 2610/02* (2013.01); *F01N 2900/1404* (2013.01);
(Continued)

(58) Field of Classification Search
CPC .......... F01N 3/02; F01N 3/0205; F01N 3/04; F01N 3/05; F01N 3/101; F01N 3/103; F01N 3/106; F01N 3/206; F01N 3/2066; F01N 3/2892; F01N 3/34; F01N 11/002; F01N 13/009; F01N 2240/02; F01N 2240/20; F01N 2260/02; F01N 2270/02; F01N 2410/02; F01N 2560/021; F01N 2560/06; F01N 2610/02; F01N 2900/1402; F01N 2900/1404; F01N 2900/1411; F01N 2900/1616
USPC ......... 60/274, 276, 286, 287, 288, 295, 298, 60/299, 301, 320, 324
See application file for complete search history.

*Primary Examiner* — Jorge Leon, Jr.
(74) *Attorney, Agent, or Firm* — Intrinsic Law Corp.; Ibrahim M. Hallaj

(57) ABSTRACT

A system for reducing ammonia in exhaust gas generated from a lean burn internal combustion engine includes an oxidation catalyst, a selective reduction catalyst (SCR), a cooling unit, and a three-way catalyst. Exhaust gas generated by the engine passes through the oxidation catalyst to oxidize carbon monoxide from the exhaust gas to form carbon dioxide. Nitrous oxide (NOx) compounds in the exhaust gas are reduced in the SCR to form nitrogen and water. The exhaust gas is then cooled in a cooling unit and then passed over the three-way catalyst. The three-way catalyst causes ammonia in the cooled exhaust stream to react to form less harmful compounds, such as nitrogen and water.

20 Claims, 16 Drawing Sheets

(51) Int. Cl.
  *F01N 3/04*  (2006.01)
  *F01N 3/05*  (2006.01)
  *F01N 13/00*  (2010.01)
  *F01N 9/00*  (2006.01)
  *F23J 15/02*  (2006.01)
  *F23J 15/06*  (2006.01)
  *F23G 7/07*  (2006.01)
  *F01N 3/28*  (2006.01)
  *F01N 3/34*  (2006.01)
  *F01N 3/20*  (2006.01)
  *F01N 11/00*  (2006.01)

(52) U.S. Cl.
  CPC ................. *F01N2900/1411* (2013.01); *F01N 2900/1616* (2013.01); *F23J 2215/10* (2013.01); *F23J 2219/10* (2013.01); *F23J 2219/80* (2013.01); *Y02E 20/12* (2013.01); *Y02E 20/363* (2013.01); *Y02T 10/22* (2013.01); *Y02T 10/24* (2013.01); *Y02T 10/26* (2013.01); *Y02T 10/47* (2013.01)

ASSEMBLY AND METHOD FOR REDUCING AMMONIA IN EXHAUST OF INTERNAL COMBUSTION ENGINES

RELATED APPLICATIONS

This application is a continuation-in-part of U.S. application Ser. No. 14/077,607, entitled "Assembly and Method for Reducing Nitrogen Oxides, Carbon Monoxide and Hydrocarbons in Exhausts of Internal Combustion Engines," filed on Nov. 12, 2013, which is a continuation of U.S. application Ser. No. 12/816,706, having the same title, filed on Jun. 16, 2010, now U.S. Pat. No. 8,578,704, which claims priority to U.S. Provisional Application No. 61/343,392, entitled "Apparatus and Method for Improving Engine Exhaust Aftertreatment in Spark-ignited Gaseous-fueled Engines," filed on Apr. 28, 2010, each of which is hereby incorporated herein by reference.

TECHNICAL FIELD

This invention relates to treatment of exhausts of internal combustion engines, and more particularly to the treatment of ammonia prevalent in the exhausts of internal combustion engines and/or the catalytic treatment systems for such exhausts.

BACKGROUND

Spark ignited (SI) internal combustion (IC) engines operated with gaseous fuels produce small amounts of undesirable chemical compounds in the combustion chamber, compounds which are exhausted from the engine at high temperatures (800°-1250° F.). For fuels composed primarily of methane and other light hydrocarbons, the commonly regulated chemicals are nitrogen oxides (NO, $NO_2$, or generally NOx) and carbon monoxide (CO). Nitrogen oxides are formed when nitrogen ($N_2$), a major component of air, reacts with oxygen ($O_2$), another major component of air, when both are exposed to high temperatures and pressures in an engine combustion chamber. Carbon monoxide, on the other hand, is the consequence of failure of the fuel to completely react with oxygen, resulting in the formation of carbon dioxide ($CO_2$). CO and NOx are problematic pollutants inasmuch as their regulated values are in many geographical regions set at or below the limits of current technology.

In strictly regulated regions, current practice to control the emissions from SI/IC engines fueled by methane-rich fuels (natural gas, bio-fuels, landfill gas, etc.), is to install systems in the engine exhaust ducting to eliminate, to the extent required by regulations, such chemicals. For smaller engines (less than 1000 bhp), the common aftertreatment system is a single stage catalyst. In these small systems, the products of combustion exiting the engine are forced through a catalyst monolith (honeycomb structure with precious metal coating) which facilitates the desirable oxidation and reduction reactions:

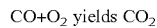

The nitrogen oxides are reduced to gaseous nitrogen ($N_2$) and oxygen ($O_2$), both benign, while the carbon monoxide (CO) is completely oxidized, forming carbon dioxide ($CO_2$), likewise non-harmful and unregulated.

Current catalyst-based emissions systems rely on very accurate control of engine operating parameters to maximize the conversion efficiency of the reactions noted above. Specifically, the simultaneous elimination of NOx and CO through such reactions in a catalytic converter requires a precise operating window of the engine combustion process relative to the mixture of air and fuel. This is depicted in FIG. 1 for a typical SI/IC engine. As shown, rich mixtures result in low NOx out of the catalyst but high CO, while lean mixtures result in low CO, but high NOx. From FIG. 1, it is evident that simultaneous cleanup of NOx and CO requires that the engine air/fuel ratio (AFR) be precisely controlled in the narrow region around the stoichiometric air/fuel ratio. Compliance of both regulated pollutants can only be maintained when the combustion stoichiometry is maintained within points A and B of FIG. 1. The acceptable combustion mixture, to achieve increasingly strict emissions standards, requires that the engine air/fuel ratio be controlled within narrow limits.

Referring still to FIG. 1, there is depicted typical engine emissions as a function of AFR from a SI/IC engine equipped with a single or multiple three-way catalyst (TWC). Meeting the regulated limits for CO and NOx requires that engine AFR be maintained between points A and B of FIG. 1, a band approximately representing the stoichiometric AFR.

Stationary SI/IC engines operating in most applications in the U.S. and elsewhere are highly regulated relative to allowable CO and NOx emissions, which are becoming increasingly controlled. Most notably, the California Air Resource Board (CARB) now recommends limits of 0.07 lb/MWh NOx and 0.1 lb/MWh CO as part of their 2007 standard for Combined Heat and Power (CHP) applications. Applying a heat recovery credit for maintaining a minimum 60% overall system efficiency and assuming a 27% electrical efficiency, the emissions limits stated in terms of actual concentration in the exhaust gas are 3.7 PPM NOx and 8.9 PPM CO. As used herein, "PPM" means parts per million by volume corrected to a standard air dilution factor (15% oxygen equivalent). The area of Southern California under the jurisdiction of the South Coast Air Quality Management District (SCAQMD) has adopted the "CARB 2007" standard for NOx, while restricting CO emissions to a value close to the CARB limit. Other regions in California are likewise adopting similar standards, while other regions of the country are phasing in regulations approaching the CARB 2007 standards (MA, NY, and NJ, for example).

Compliance with the newer standards requires extremely high conversion efficiency in the catalyst for both CO and NOx. Extra-large conversion monoliths are needed in addition to extreme precision in controlling the air/fuel mixture.

FIG. 2 depicts the steady-state AFR control precision required for a standard engine (e.g., model TecoDrive 7400) utilizing a TWC system sized to conform to CARB 2007, as indicated by a pre-catalyst narrow-band heated exhaust gas oxygen sensor millivolt (mV) output that the AFR controller maintains via steady-state (non-dithering) AFR control. As shown in FIG. 2 the engine combustion mixture (air to fuel ratio) is acceptable for catalyst performance to regulated limits only when the signal from a standard lambda sensor in the exhaust duct is maintained between 680 and 694 mV. Above this range, the CO concentration exiting the catalyst exceeds the SCAQMD limit of 8.9 PPM, while below this range the NOx will rapidly exceed the 3.7 PPM limit. Limits shown in FIG. 2 are those of CARB 2007 with a credit for engine heat recovery, such that 60% of the fuel's heat content is purposefully used as electric power or recovered thermal energy. In order to maintain compliance, combustion air to fuel mixture must be maintained within the 14 mV window for the example shown.

A possible method for expanding the control window for engine operation to attain acceptable emissions from both CO and NOx, is to modify the system such that two stages of catalyst systems are used, each operating in distinctly different chemical atmospheres. Early catalyst systems commonly used a two-stage design with inter-stage air injection. In this era, single purpose catalyst monoliths-oxidation or reduction, but not both, were employed. Later, as multi-purpose, single stage catalysts (TWC) were developed, these became the dominant style. The early two-stage systems were employed in stationary gaseous fueled SI/IC engines with success but under far less strict standards. Presumably, the NOx reformation problems encountered with the two-stage systems were present in the earlier era, but were inconsequential relative to the regulated limits at that time.

FIG. 3 depicts the above-described arrangement. As shown, two catalyst stages are plumbed into an exhaust system in series. Air is pumped into the exhaust stream between stages one (CAT 1) and stage 2 (CAT 2) and mixed thoroughly. The engine air-to-fuel ratio is maintained so as to facilitate effective NOx removal in the first stage. The air injected into the exhaust results in an oxidizing environment at the second catalyst stage biased towards the oxidation of CO to $CO_2$, even if the engine AFR is outside the acceptable operating window on the rich side, a highly significant benefit.

Tests utilizing the two-stage system demonstrated that the two-stage strategy with air injection was not only ineffective, but actually detrimental to catalyst performance. NOx emissions from the two-stage system were found to be generally higher than a single-stage system of comparable size and catalyst material loading. This surprising result indicated that a mechanism exists such that NOx is formed in the second stage, made possible by the oxygen rich environment, coupled also with conditions conducive to chemical reaction, i.e., high temperature and an abundance of a catalytic material.

FIG. 9 is a block diagram of a system 900 for treating exhaust from a lean-burn internal combustion engine 910 according to the prior art. The system 900 includes an oxidation catalytic converter 920, a selective catalytic reduction converter (herein "SCR") 930, and an ammonia slip catalyst 940. In operation, a lean-burn engine generates an exhaust stream 915 that includes carbon monoxide and nitrous oxide (NOx) compounds. The exhaust stream 915 passes across an oxidation catalyst 920 that is configured to oxide carbon monoxide (CO) in the exhaust stream to carbon dioxide ($CO_2$), which is less harmful to the environment. The exhaust stream 915 then passes into the SCR 930, which uses ammonia ($NH_3$) or urea ($CH_4N_2O$) as a reducing agent. The reducing agent reacts with the NOx compounds to form nitrogen ($N_2$) and water ($H_2O$). While ideally the reducing agent would fully react in the SCR 930, a fraction of the reducing agent does not react in the SCR 930. This fraction of unreacted reducing agent remains in the exhaust output from the SCR 930. This issue is generally referred to as ammonia slip. To address ammonia slip, the exhaust passes over an ammonia slip catalyst 940, which is configured to eliminate at least a portion of the unreacted ammonia present in the exhaust stream. Some catalysts currently available (e.g., from Johnson Matthey and MIRATECH) lack the features and capabilities of the presently disclosed systems.

There is a therefore a need for alternative catalysts to address ammonia slip.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

In an aspect, a method of operating a catalytic system for reducing emissions of ammonia from a lean burn internal combustion engine is disclosed. The method includes combusting a hydrocarbon fuel in an internal combustion engine having an air to fuel ratio (AFR) greater than a stoichiometric AFR needed for a complete combustion of the fuel. The method also includes passing an exhaust gas generated from the engine over an oxidation catalyst. The oxidation catalyst is configured to oxidize CO in the exhaust gas to form CO The method also includes passing the oxidized exhaust gas over a selective catalytic reduction (SCR) converter to form an oxidized and reduced exhaust gas. The SCR converter is configured to reduce NOx in the oxidized exhaust gas to form $N_2$ and $O_2$. The method also includes cooling the oxidized and reduced exhaust gas to a temperature of about 475° F. to about 640° F. The method also includes passing the cooled exhaust gas over a three-way catalyst to reduce a concentration of $NH_3$ in the cooled exhaust gas. As an example, the catalyst may promote the reaction: $4NH_3 + 3O_2 \rightarrow 2N_2 + 6H_2O$.

In another aspect, a system for reducing emissions of ammonia in exhaust from a lean burn internal combustion engine is disclosed. The system includes an oxidation catalytic converter in fluid communication with a lean burn internal combustion engine. The oxidation catalytic converter is configured to oxidize CO to form $CO_2$, the CO being included in an exhaust gas generated by the internal combustion engine. The system also includes a selective catalytic reduction converter (SCR) in fluid communication with an output of the oxidation catalytic converter. The SCR is configured to reduce NOx in the oxidized exhaust gas. The system also includes a cooling unit in fluid communication with an output of the SCR. The system also includes a three-way catalytic converter in fluid communication with an output of the cooling unit.

BRIEF DESCRIPTION OF THE DRAWINGS

Reference is made to the accompanying drawings in which are shown illustrative embodiments of the invention, from which its novel features and advantages will be apparent. In the drawings.

DETAILED DESCRIPTION

Figure 4:
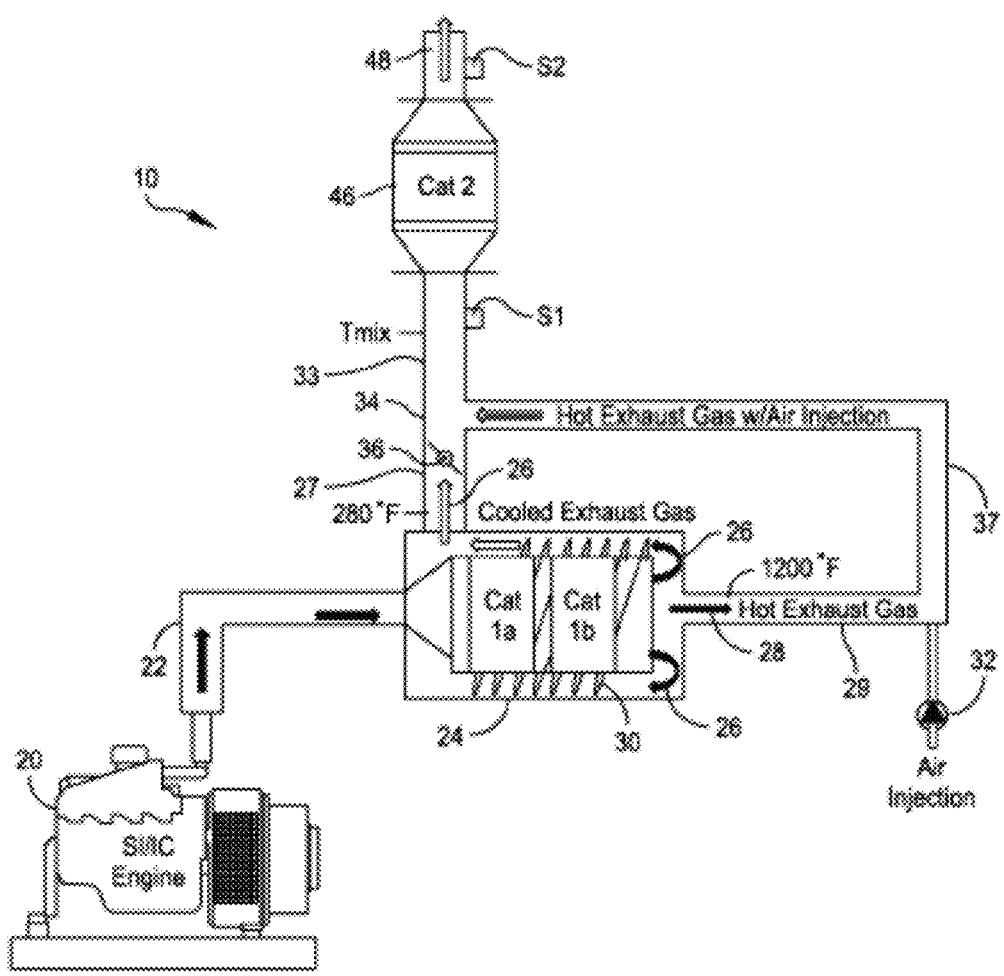
FIG. 4 is a diagrammatic depiction of an assembly and method for reducing nitrogen oxides, carbon monoxide and hydrocarbons in the exhaust of an engine, in accordance with an embodiment of the invention.

Testing of a two-stage system with inter-stage cooling was conducted using an apparatus depicted in FIG. 4. As shown in FIG. 4, the engine exhaust gases exit an engine 20 and are channeled by an exhaust gas conduit 22 to a catalytic converter first stage 24 having at least one, and preferably two, catalytic converters, Cat 1a and Cat 1b, Two catalytic elements are preferred, instead of one, to achieve high performance in the first stage 24 relative to NOx removal. A single catalytic converter element works well for the disclosed system with a slightly compromised performance of the first stage 24.

The combustion gases from the engine 20 enter the first stage 24 at a normal engine exhaust temperature (approximately 1200° F.), after which the exhaust flow is split into two streams 26, 28. One stream 26 is cooled to approximately 280° F. as it passes over cooling means 30, or through a conduit subject to an injected cooling medium adapted to vaporize and substantially reduce the stream temperature. The other stream 28 bypasses the cooling coils 30 and is injected with a controlled quantity of air from an air injector 32. The two streams 26, 28 rejoin, as at junction 34, then are piped into a second catalytic stage (Cat 2) 46. The extent of the exhaust gas cooling can be adjusted with a temperature adjusting valve 36.

Three tests were conducted with this apparatus that demonstrate the disclosed invention, the tests being summarized below.

In a first experiment, the engine 20 was operated at high output (156 bhp and 2500 rpm) and fueled by natural gas. The temperature adjusting valve 36 was set such that most of the gases bypassed the cooling coils 30. Under steady state engine operation, and with the engine AFR fixed at a condition favoring NOx reduction out of the Stage 1 catalysts 24, the experiment summarized in FIG. 5 was initiated.

During the first 200 seconds and with no inter-stage air injection, the concentrations of NOx, CO, and 02 in the exhaust system, as well as the inter-stage exhaust temperature ("Tmix") were measured at port S1 (FIG. 4). In this time frame, and with sampling at S1, the emissions of NOx were well below the compliance limit, while CO values were noncompliant. Further, the inter-stage exhaust temperature was high, as expected (approximately 800° F.), while the $O_2$ concentration was very close to zero, indicative of near-stoichiometric operation. At 200 seconds and in preparation of air injection to begin, the sample port was moved to S2 (FIG. 4), immediately after the second stage (Cat 2). As expected, the CO and NOx concentrations measured after the second stage were modestly lower with the benefit of the additional catalyst element.

Figure 5:
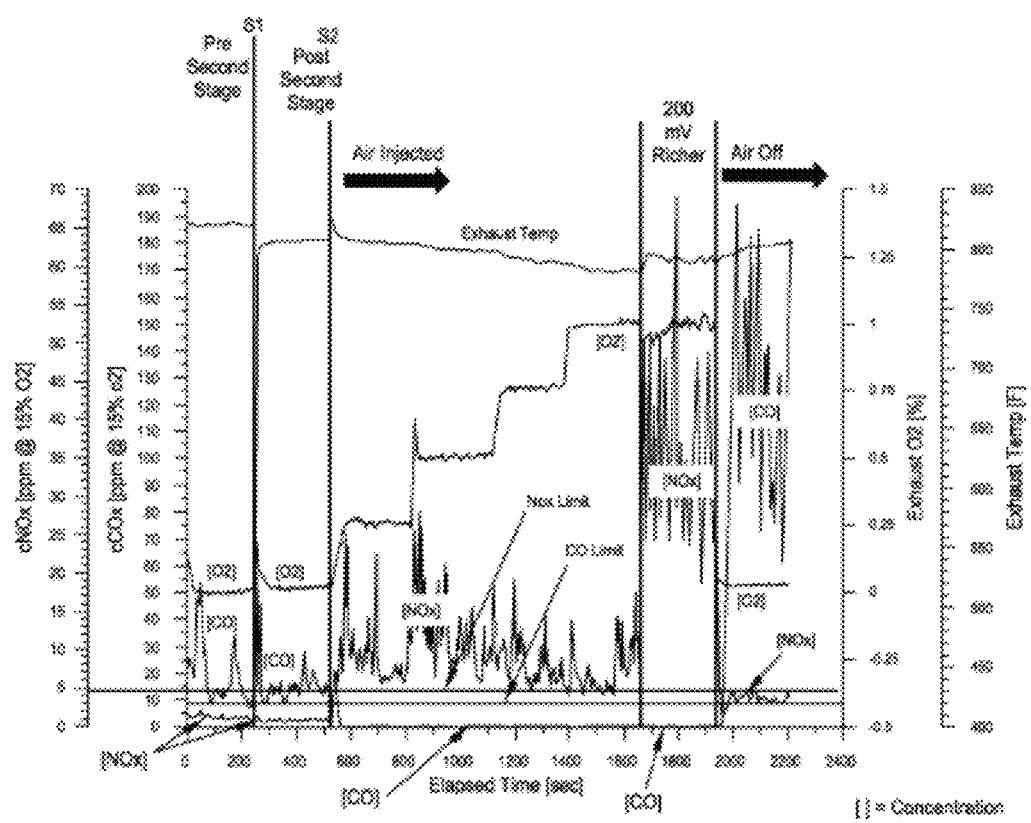
FIG. 5 is a chart illustrating the results of Test 1 described hereinbelow.

At 520 seconds inter-stage air injection was initiated, as is clearly indicated in FIG. 5 by the step change in $O_2$ concentration at port S2. CO immediately decreased to near zero, but NOx levels sharply increased, demonstrating the disappointing result obtained in the past without benefit of this invention.

As air injection was increased stepwise at 800, 1100. and 1400 seconds, the NOx improved slightly, but remained highly noncompliant. At 1660 seconds, a change in the engine combustion was made to a richer value, which only worsened the NOx emissions.

Figure 1:
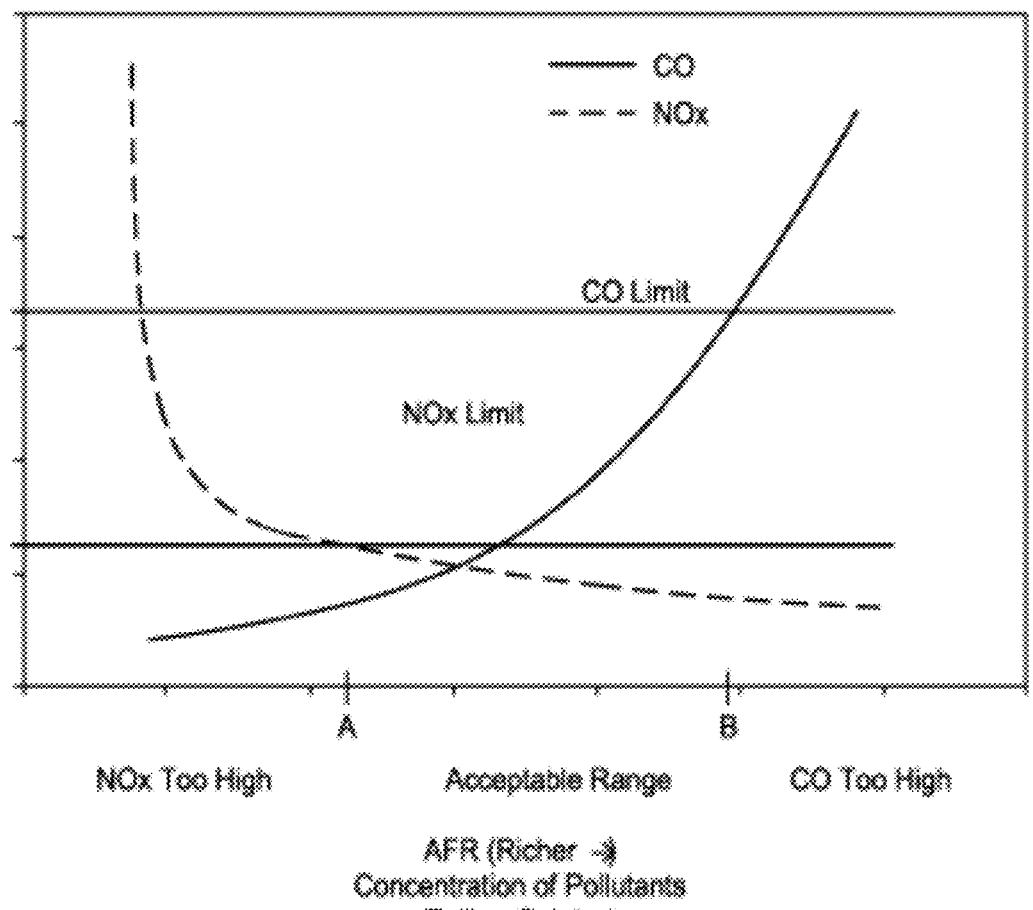
FIG. 1 is a chart depicting prior art relationships between nitrogen oxides and carbon monoxide present in engine exhaust gases, within and beyond acceptable ranges, given a precisely controlled air/fuel ratio.
Figure 2:
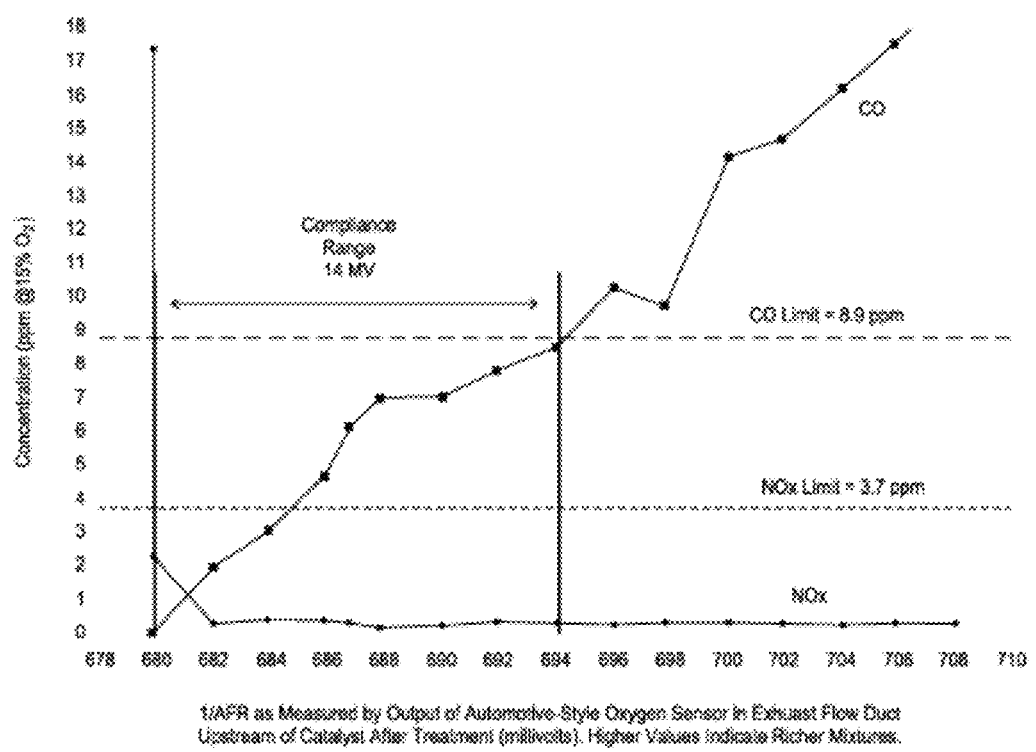
FIG. 2 is a chart illustrating the prior art steady-state air/fuel ratio control precision required for a standard engine, using a three-way catalyst.
Figure 3:
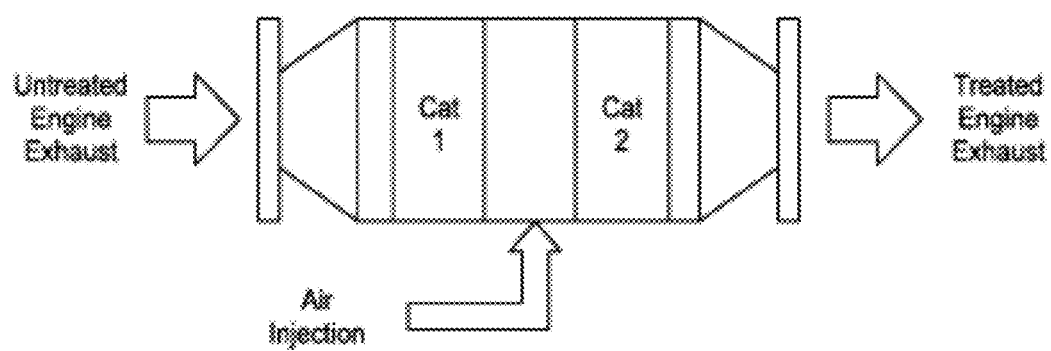
FIG. 3 is a diagrammatic depiction of a prior art two-stage catalyst system with inter-stage air injection.

At 1950 seconds, the air injection was discontinued, essentially returning the process to a single stage. In this final time segment, operating as a single stage system with a rich AFR, the NOx concentration was measured to be low, while the CO was found to be high, the expected result (see FIG. 1).

Figure 6:
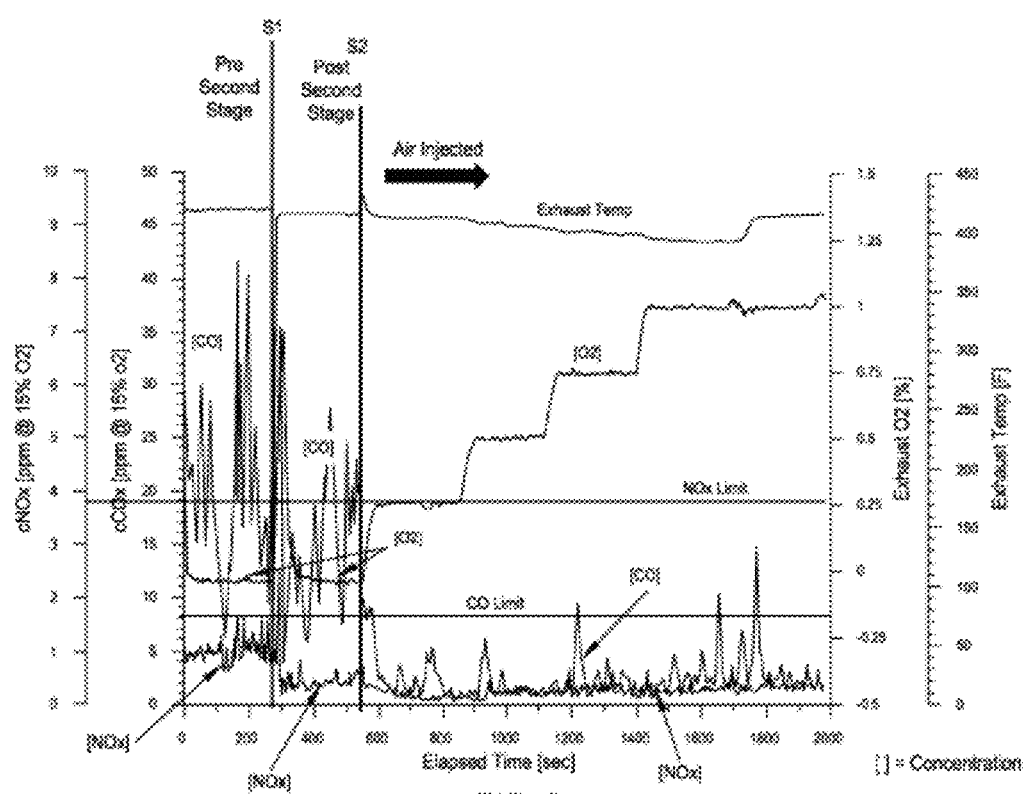
FIG. 6 is a chart similar to FIG. 5, but illustrating markedly different and greatly improved reductions of nitrogen oxides and carbon monoxide in use of the assembly of FIG. 4.

In a second experiment, Test 1 was repeated, but with inter-stage cooling increased to achieve lower "Tmix" values (400° F. range). The results, shown in FIG. 6, were markedly different. When air injection commenced at 550 seconds, the NOx concentration decreased from 0.5 PPM to approximately one half of the value, while the CO likewise reduced to concentrations well below compliance limits. Compliance testing is based on time average data taken over extended intervals with short-term spikes, such as those seen in Test 2 (FIG. 6), and which are permitted as long as they are not excessive.

The air injection, which had substantially negative effect on emissions at the higher temperature, was highly effective in improving the process when inter-stage cooling was substantially increased. It is important that the NOx reduction was not anticipated and is a very significant benefit of the process.

Figure 7:
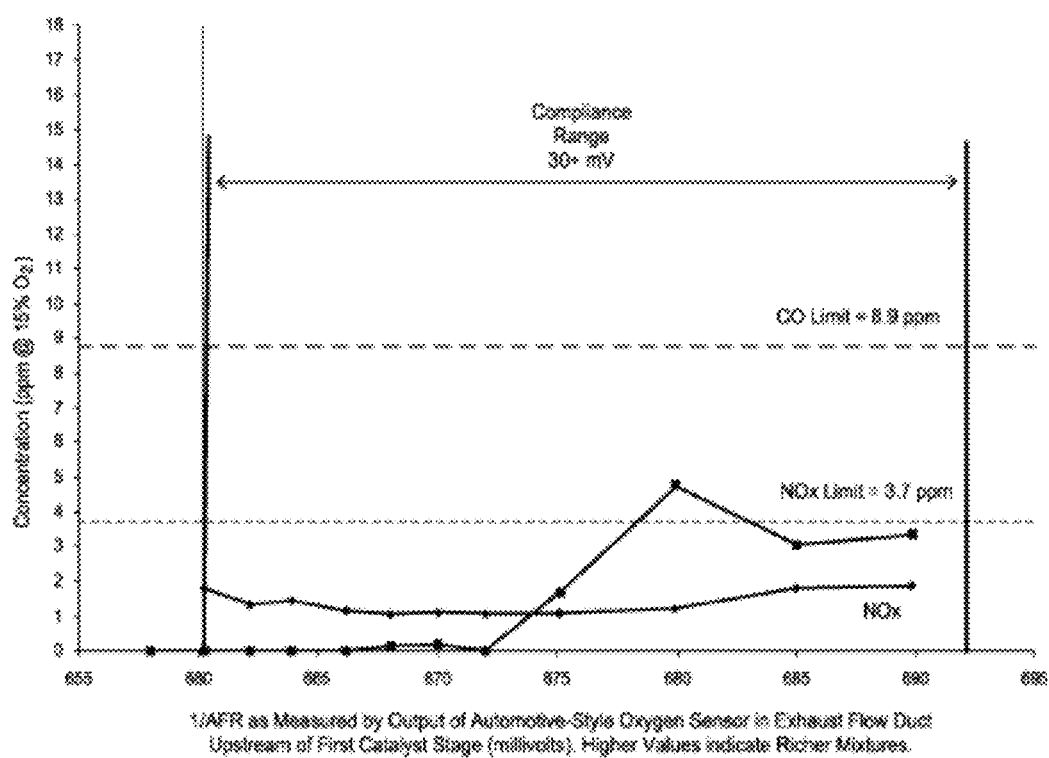
FIG. 7 is a chart showing that even with maladjustment of the air-to-fuel ratio controller, the inventive assemblies and methods provide for lower emissions and greater tolerance for excursions in engine air-to-fuel ratios.

In a third test, the system was first adjusted to a steady state condition that provided near optimum performance, namely inter-stage cooling to approximately 520° F. with air injection equal to approximately 1% of the primary combustion air. Next, an engine air to fuel ratio controller was adjusted stepwise to alternate steady state operating points, both richer and leaner, to determine the tolerance of the process to maladjustment. The results, shown in FIG. 7, indicate that the process was successfully compliant with lambda sensor readings from 660 mV to greater that 692 mV, essentially double the compliance window of the single stage catalyst system.

The new assembly and method provides, therefore, both lower emissions and greater tolerance for excursions in engines with air-fuel ratio under steady-state (non-dithering) fuel control. The same phenomenon and conclusions are applicable to dithering fuel control strategies, but with increases in the AFR compliance window, as measured by post-catalyst exhaust oxygen or lambda sensors.

There is thus provided by the present invention an assembly 10, shown in FIG. 4, for reducing nitrogen oxides, carbon monoxide and hydrocarbons in internal combustion engine exhausts. The assembly comprises a first exhaust conduit 22 having an exhaust receiving end for connecting to and extending from an internal combustion engine 20, a first stage catalytic converter means 24 in communication with a dispensing end of the first exhaust conduit 22, cooling means, such as cooling coils 30, disposed on the first stage catalytic converter means 24 for cooling a first portion of engine exhausts received from the first exhaust conduit 22.

The assembly further includes a first outlet conduit 27 for facilitating movement of the cooled first portion stream 26 of engine exhausts from the first stage catalytic converter means 24, a second outlet conduit 29 for facilitating movement of the second stream 28 of engine exhausts received from the first stage catalytic converter means 24, an air injection conduit 37 which receives air from the air injector 32 and is in communication with the second outlet conduit 29 for cooling the second portion of engine exhausts, a second exhaust gas conduit 33 in communication with the first outlet conduit 27 and the air injection conduit 37, and a second stage catalytic converter 46 in communication with the second exhaust gas conduit 33 and having an exhaust emitting outlet 48. The first outlet conduit 27 may optionally be provided with a temperature adjusting valve 36.

In operation of the assembly of FIG. 4, exhaust gases from the engine 20 pass through the first exhaust conduit 22 and into the first stage catalytic converter means 24 wherein a portion 26 of the exhaust is cooled and passed on to the first outlet conduit 27. A second portion 28 of the exhaust is not substantially cooled and is passed on to the second outlet conduit 29.

The air injector 32 injects air into the second outlet conduit 29. The hot exhaust gas of the second exhaust stream 28 and injected air proceed through the air injection conduit 37 and merge with the cooled stream 26 of exhaust gas and proceed to the second catalytic converter stage 46 and exit therefrom at outlet 48.

Figure 8:
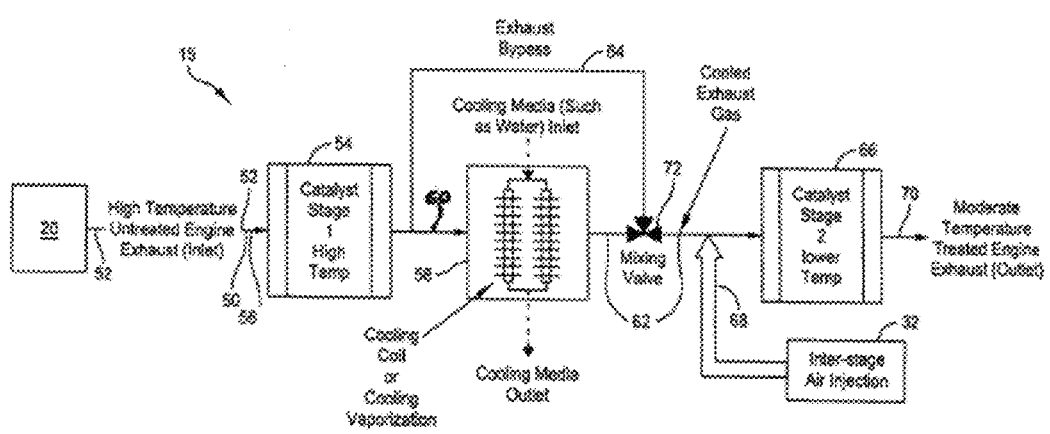
FIG. 8 is a diagrammatic depiction of a further assembly and method for reducing emissions of nitrogen oxides, carbon monoxide and hydrocarbons in internal combustion engines.

There is further provided an alternative embodiment 15 of the assembly for reducing nitrogen oxides, carbon monoxide and hydrocarbons in internal combustion engine exhausts, the alternative assembly 15 being shown in FIG. 8 and comprising a first exhaust conduit 50 having an exhaust receiving end 52 connected to and extending from the internal combustion engine 20, a first stage catalytic converter means 54 in communication with a dispensing end 56 of the first exhaust conduit 50, cooling means 58 in communication with the first stage catalytic converter means 54 for cooling a first portion 60 of engine exhausts received from the first stage catalytic converter means 54, and a conduit 62 for cooled exhaust, the conduit 62 extending from the cooling means 58.

The assembly 15 further includes a cooling means by-pass 64 in communication with the output of the first stage catalytic converter means 54 and the conduit 62 for cooled exhaust.

A second stage catalytic converter means 66 is in communication with the cooled exhaust conduit 62 and the cooling means by-pass conduit 64. An air injection conduit 68 is in communication with the cooled exhaust conduit 62. An exhaust outlet 70 extends from the second stage catalytic converter means 66.

In operation of the assembly of FIG. 8, exhaust gases from the engine 20 flow to the first stage catalytic converter 54. A first portion of the exhaust leaving the first catalytic converter stage 54 is directed to the cooling means 58. A second portion of the exhaust leaving the first catalytic converter stage 54 enters a cooling means bypass conduit 64 which joins the cooled exhausts conduit 62 exiting the cooling means 58. The combined exhaust from the cooling means 58 and the by-pass conduit 64 combine, as at mixing valve 72, and are subjected to an injection of air from the air injector 32, and directed to the second stage catalytic converter means 66, from which the exhaust issues through the outlet 70 with greatly reduced nitrogen oxides and carbon monoxide.

There is further provided in conjunction with the assembly 10, shown in FIG. 4, a method for reducing nitrogen oxides, carbon monoxide and hydrocarbons from exhausts of internal combustion engines. The method comprises the steps of conveying the engine exhaust to a first stage catalytic converter 24, cooling a first portion of the engine exhaust in the first stage catalytic converter 24 and removing the cooled first portion from the catalytic converter through a first exhaust gas outlet conduit 27, removing a non-cooled portion of the engine exhaust from the catalytic converter 24 through a second exhaust gas outlet conduit 29, injecting air into the second outlet conduit 29, conveying the non-cooled second portion of the engine exhaust and the injected air through air injection conduit 37 to the first exhaust gas outlet conduit 27 to join with the cooled first portion of the engine exhaust in the air injection conduit 37.

The method further comprises directing the exhaust in the exhaust gas conduit 33 to a second stage catalytic converter 46, and discharging exhaust from the second stage catalytic converter 46, whereby to provide engine exhausts of less nitrogen oxides and less carbon monoxide content.

There is further provided in conjunction with the assembly 15, shown in FIG. 8, a method for reducing nitrogen oxides, carbon monoxide and hydrocarbons from exhausts of internal combustion engines.

The method comprises the steps of conveying the engine exhausts to a first stage catalytic converter 54 and conveying the engine exhaust from the first stage catalytic converter 54 in part to a cooling means 58 and in part to a cooling means bypass 64, and mixing exhausts from the cooling means 58 and the cooling means bypass 64 in a cooled exhaust conduit 62, injecting air through an air injection conduit 68 into the cooled exhaust conduit 62, and directing the exhaust from the cooling means 58, and from the cooling means by-pass 64, and from the injected air conduit 68, to a second stage catalytic converter 66, and discharging through an outlet 70 the engine exhausts thus treated, whereby to provide engine exhausts of less nitrogen oxides and less carbon monoxide content.

In accordance with a still further feature of the invention there is provided a method for reducing nitrogen oxides, carbon monoxide and hydrocarbons in exhausts of spark-ignited gaseous fueled internal combustion engines. The method comprises the steps of directing the exhausts from an engine 20 to a first stage catalytic converter 24, 54, directing a first portion of exhaust output from the first stage catalytic converter 24, 54 (FIGS. 4 and 8) to a cooling means 30, 58 and thence to a cooled exhaust conduit 26, 62, directing a second portion of exhaust output from the first stage catalytic converter 24, 54 to a non-cooled exhaust gas conduit 28, 64, uniting the first and second portions of exhaust gas and directing the united first and second portions to a second catalytic converter 46, 66 and injecting air into a selected one of (1) the non-cooled exhaust conduit 29, 64 and (2) the united cooled and non-cooled exhausts after the uniting thereof.

Figure 4A:
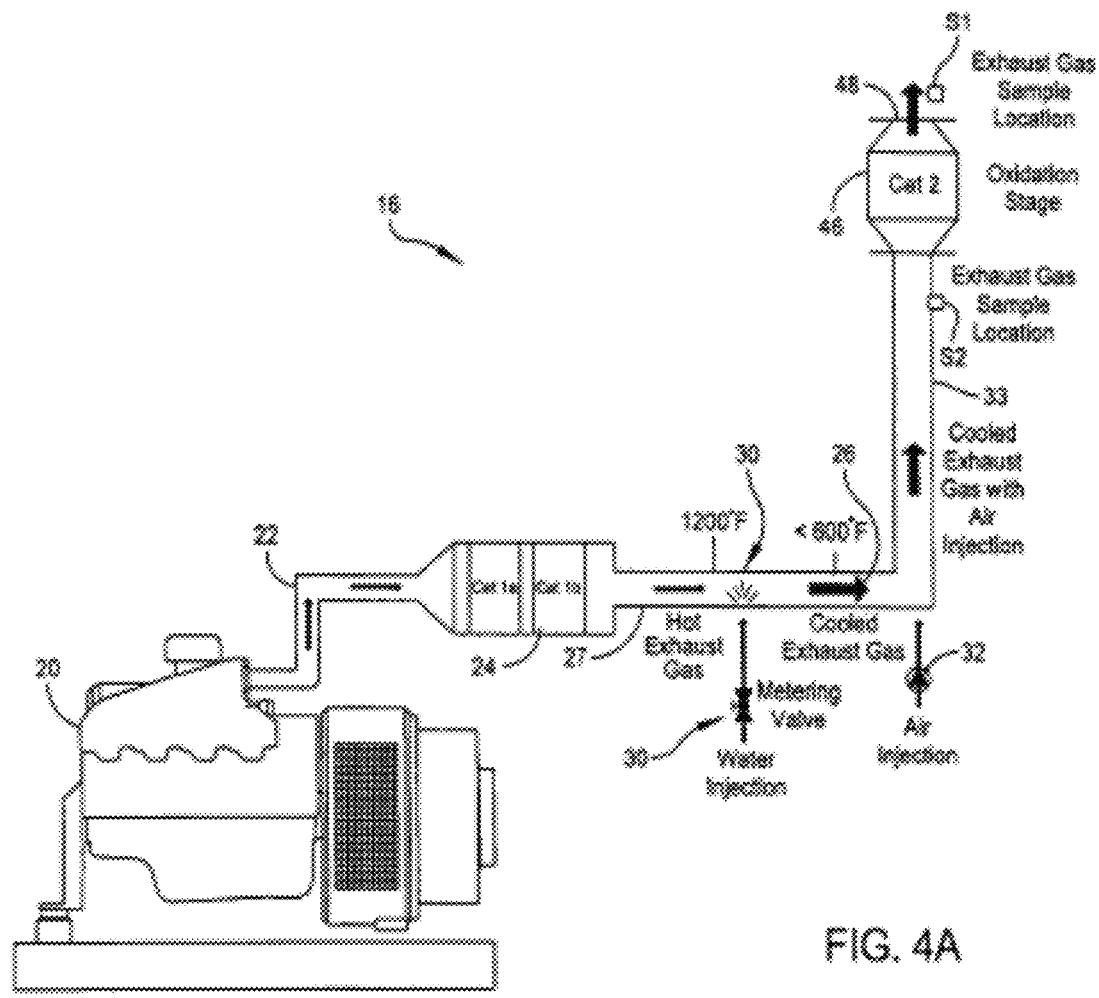
FIG. 4A is a diagrammatic depiction of an alternative assembly.

In an alternative embodiment 16 of the system of FIG. 4, for use in situations in which the load is steady and the liquid used for cooling is maintained at a steady rate, the embodiment of FIG. 4A can be provided and operated without the hot exhaust gas outlet conduit 29 and an injection conduit 37 shown in FIG. 4.

Figure 8A:
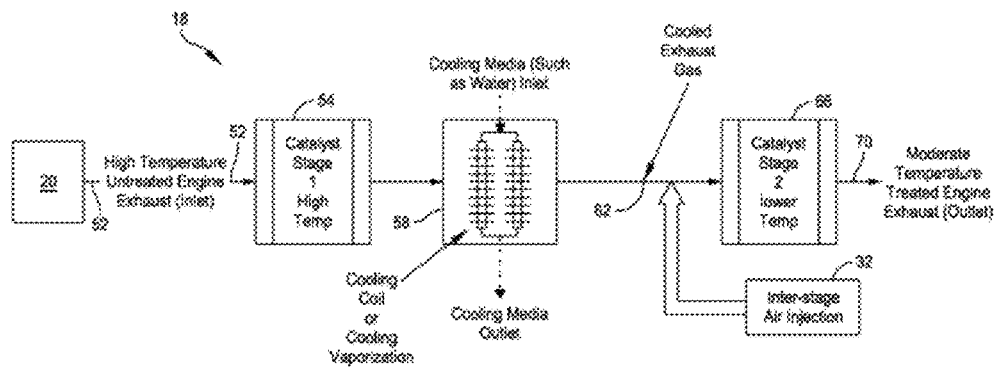
FIG. 8A is a diagrammatic depiction of a still further alternative assembly.
Figure 9:
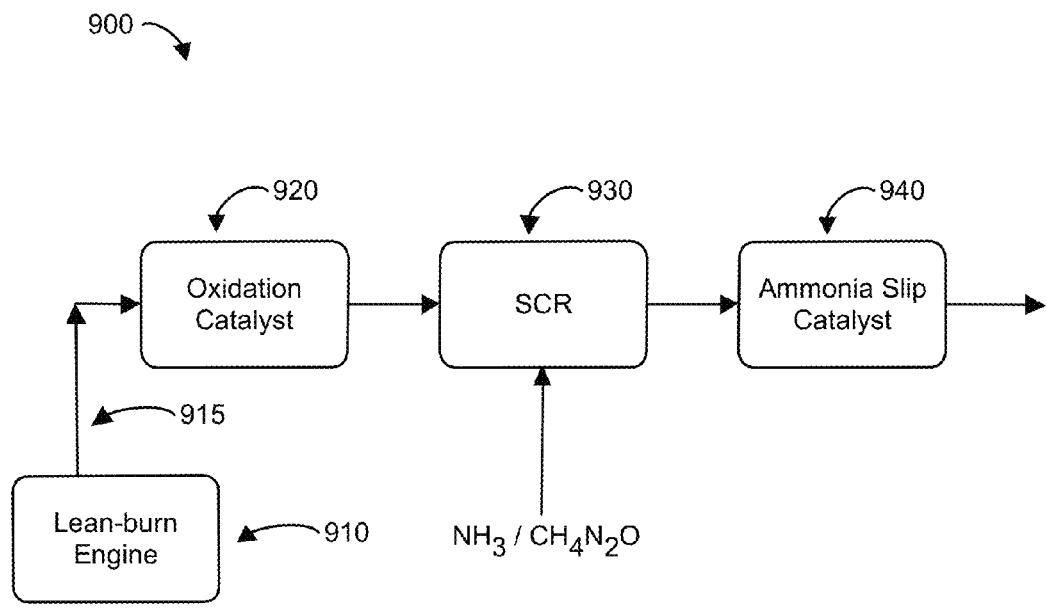
FIG. 9 is a block diagram of a prior art system for treating exhaust from a lean-burn internal combustion engine.

Similarly, an alternative embodiment 18 (FIG. 8A) can effect the desired lowering of emissions in a system maintained at a steady load and a steady rate, in which the exhaust by-pass 64 and mixing valve 72 are omitted from the assembly, as is illustrated in FIG. 8A.

Thus, the alternative embodiment of the FIG. 4 assembly, shown in FIG. 4A, comprises the exhaust conduit 22, the cooling means 30 of vaporization construction, the outlet conduit 27, the exhaust gas conduit 33, the air injector 32 disposed to inject air into the exhaust gas conduit 33, and the second stage catalytic converter means 46 and its outlet 48.

The method for reducing nitrogen oxides, carbon monoxide and hydrocarbons in exhaust from internal combustion engines utilizing the assembly shown in FIG. 4A comprises the steps of directing exhaust from the internal combustion engine to a first stage catalytic converter means, water-cooling the exhausts from the catalytic converter means and directing the cooled exhausts toward a second stage catalytic converter means, injecting air into the cooled exhausts, directing the air-cooled exhausts into the second catalytic converter means, and discharging the exhausts therefrom.

The alternative embodiment of FIG. 8A comprises an assembly the same as is shown in FIG. 8, but without the exhaust by-pass 64 and the mixing valve 72. That is, the assembly comprises an exhaust conduit 52, a first stage catalytic converter means 54 in communication with a cooling means, the cooling means 58 having coils or a cooling vaporization facility. The assembly further includes air injections means 32 for injecting air into an output line 62 from the cooling means 58, and a second stage catalytic converter means 66 with an outlet 70 for treated exhausts.

The method for reducing nitrogen oxides, carbon monoxide and hydrocarbons in exhausts from internal combustion engines utilizing the assembly shown in FIG. 8A comprises the steps of directing exhausts from the internal combustion engine to the first catalytic converter means, cooling exhausts from the first catalytic converter, injecting air into the cooled exhausts, directing the cooled exhausts into a second stage catalytic converter means, and discharging the exhausts from the second catalytic converter means.

Figure 10:
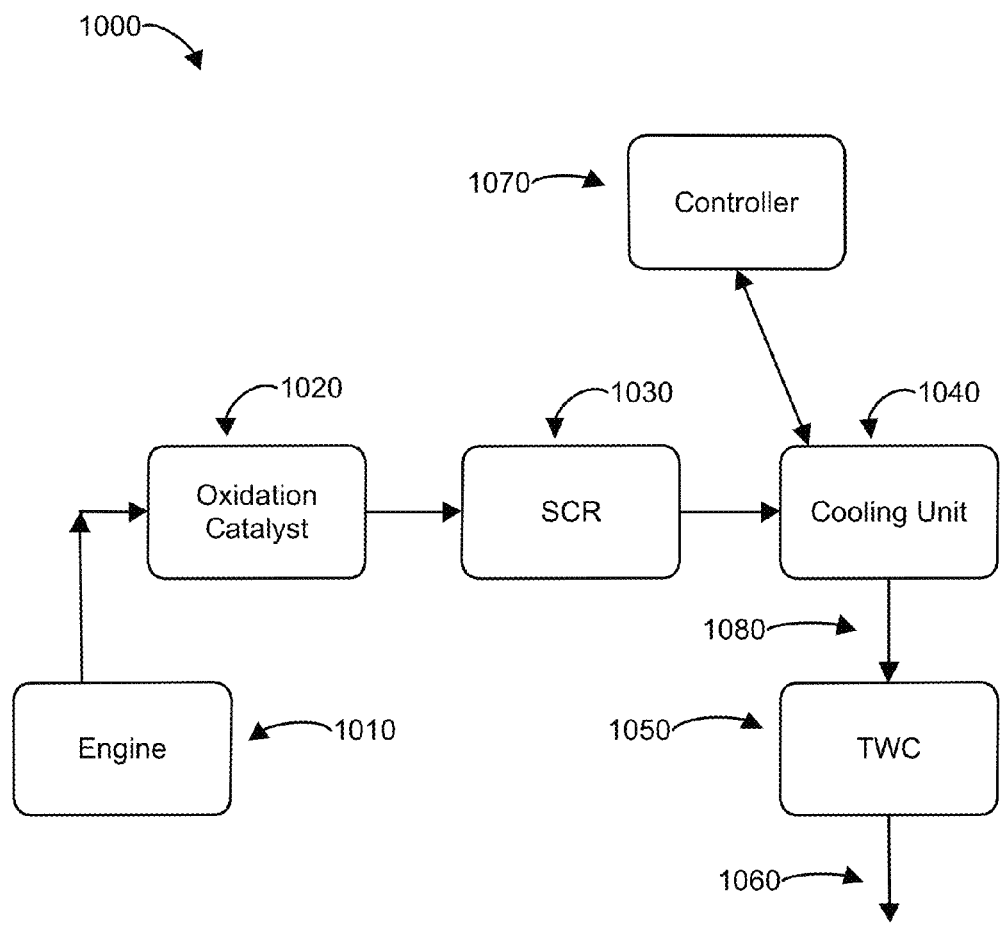
FIG. 10 is a block diagram of a system for treating exhaust from a lean-burn internal combustion engine.

FIG. 10 is a block diagram of a system 1000 for treating exhaust from a lean-burn internal combustion engine 1010. The system includes an oxidation catalytic converter 1020, a SCR 1030, a cooling unit 1040, and a three-way catalyst (herein "TWC") 1050. The oxidation catalytic converter 1020 can be a conventional oxidation catalytic converter as known to those skilled in the art. For example, the oxidation catalytic converter 1020 can include one or more platinum group metals (Pt, Ir, Rh, and Pd) as the active element. The oxidation catalytic converter 1020 is in fluid communication with an exhaust output of the engine 1010 and an input of the SCR 1030. In operation, the oxidation catalytic converter 1020 oxidizes carbon monoxide (CO) present in the exhaust gas generated by the engine 1010 to form carbon dioxide ($CO_2$). The exhaust gas generated by the engine 1010 can be between 650° F. and 750° F. or about 700° F. The engine 1010 can be a spark-ignited internal combustion engine (e.g., using liquid fuel such as gasoline or gaseous fuel such as natural gas), a diesel engine, or a turbine, such as a microturbine, here meaning a turbine with a maximum output of 1 megawatt of power in some embodiments. One microturbine in the present context has a maximum output of 500 kW of power. The engine 1010 is operated in configured to operate in lean burn mode in which the air to fuel ratio (AFR) for the engine 1010 is greater than a stoichiometric AFR needed for a complete combustion of the fuel in the engine 1010. In general, the engine 1010 in lean burn mode combusts the fuel in an excess of oxygen/air. In some embodiments, the engine 1010 is a stationary engine configured for a combined heat and power (CHP) application. The fuel can be hydrocarbon based, such as diesel, gasoline, natural gas, propane, or the like.

The SCR 1030 can be a conventional SCR as known to those skilled in the art. For example, the SCR 1030 includes a catalyst and a reducing agent. The catalyst can include vanadium, molybdenum, tungsten, a zeolite, and/or a precious metal. The reducing agent can include ammonia and/or urea. The SCR 1030 is in fluid communication with an output of the oxidation catalytic converter 1020 and an input of the cooling unit 1040. In operation, the SCR 1030 reduces nitrous oxide compounds (NOx) present in the exhaust gas to form nitrogen (N2) and water ($H_2O$).

The cooling unit 1040 can be a heat exchanger, a series of cooling coils, a water injector, a cooling vaporization facility, an air injector, or the like. The cooling unit 1040 is in fluid communication with at least a portion of an output of the SCR 1030. The cooling unit 1040 is also in fluid communication with an input of the TWC 10150. In operation, the cooling unit 1040 cools the exhaust gas output from the SCR 1030 to a reduced temperature, for example between about 475° F. to about 640° F. The reduced temperature can be selected to optimize the removal of ammonia from the exhaust stream as described below. In some embodiments, the cooling unit 1040 is the same as or similar to the cooling means 30 or the cooling means 58 described above.

The TWC 1050 can be a conventional TWC as known to those skilled in the art. For example, the TWC can include one or more platinum group metals as the active element. The TWC 1050 is in fluid communication with an output of the cooling unit 1040 and an exhaust output conduit 1060. In operation, the TWC 1050 eliminates at least some of the ammonia in the exhaust stream. It is contemplated by the inventors that the TWC 1050 reduces the ammonia ($NH_3$) to form N2 and $H_2O$. Ammonia can be present in the exhaust stream due to ammonia slip from the SCR 1030 as discussed above. Since urea has some of the same chemical components as ammonia, urea may also be eliminated or reduced in the second stage of a TWC if urea is used as a reducing agent in the SCR.

In some embodiments, a microprocessor-based controller 1070 is in communication with the cooling unit 1040, for example to adjust the amount of cooling applied to the exhaust stream and, thus, the output temperature of same. In some embodiments, a thermocouple is disposed in a conduit 1080 between the cooling unit 1040 and the TWC 1050 to provide a feedback signal to the controller 1070. In some embodiments, a sensor is disposed downstream of the TWC 1050 to provide feedback to the controller 1070 on the measured ammonia concentration in the exhaust exiting the TWC 1050. In addition, feed forward sensors and controls can be used. For example, a flow rate and/or temperature sensor can be disposed upstream of the cooling unit 1040 to provide a feed forward signal to the controller 1070.

It is noted that the system described with respect to FIG. 10 can also be applied to rich burn internal combustion engines. Air injection may be employed in rich burn engines so that rich burn engines are substituted for lean burning engines in the above embodiments. For example, if the second-stage catalyst 46, 66 described in connection with FIGS. 4, 4A, 8, and 8A is a TWC, the TWC may be associated with at least a portion of the ammonia in the incoming cooled/mixed exhaust stream to react as described above, which results in a reduction in ammonia concentration of the outgoing exhaust stream passing though outlet 48, 70.

Figure 11:
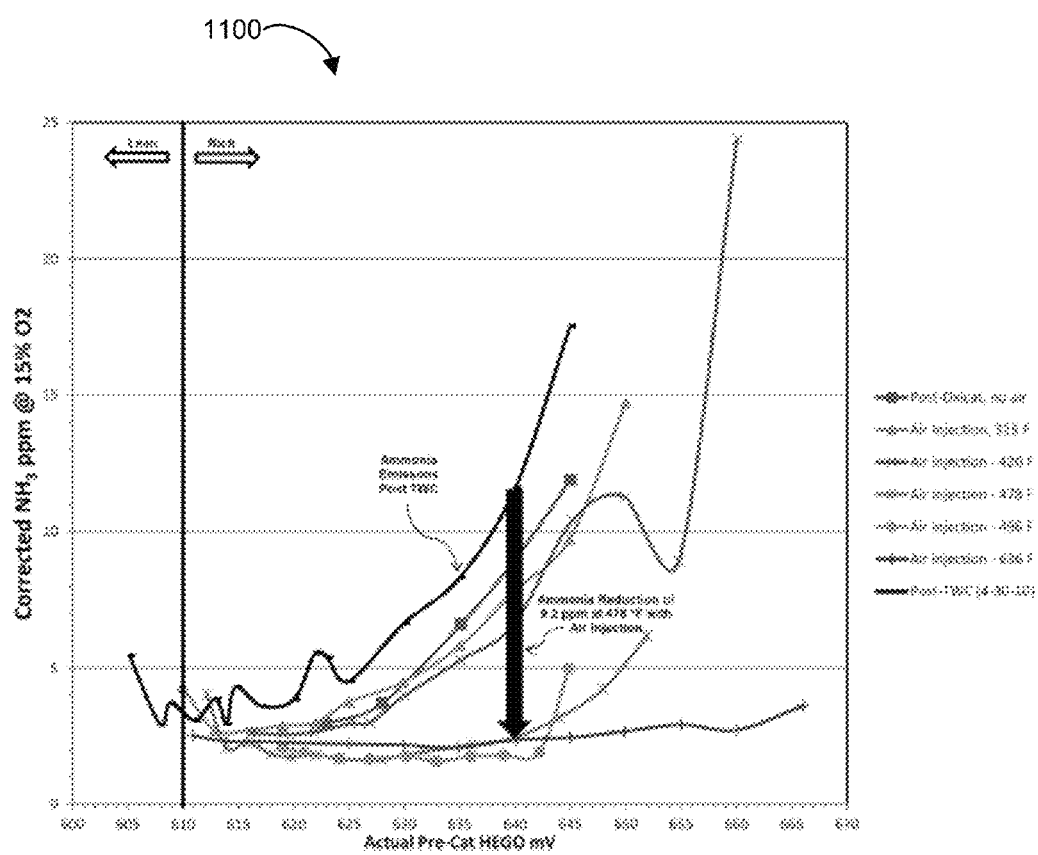
FIG. 11 is a chart showing the concentration of ammonia in a cooled exhaust stream after passing through a three-way catalyst at various temperatures.

FIG. 11 is a chart 1100 showing the concentration of ammonia in a cooled exhaust stream after passing through a TWC at various temperatures. As illustrated in the graph 1100, the ammonia concentration was reduced more at temperatures 478° F., 496° F., and 636° F. than at temperatures 325° F. and 420° F. Although the data for the graph 1100 is based on a rich-burn exhaust stream injected with air, it is contemplated that a similar result would occur in a lean-burn exhaust stream without injected air.

Figure 12:
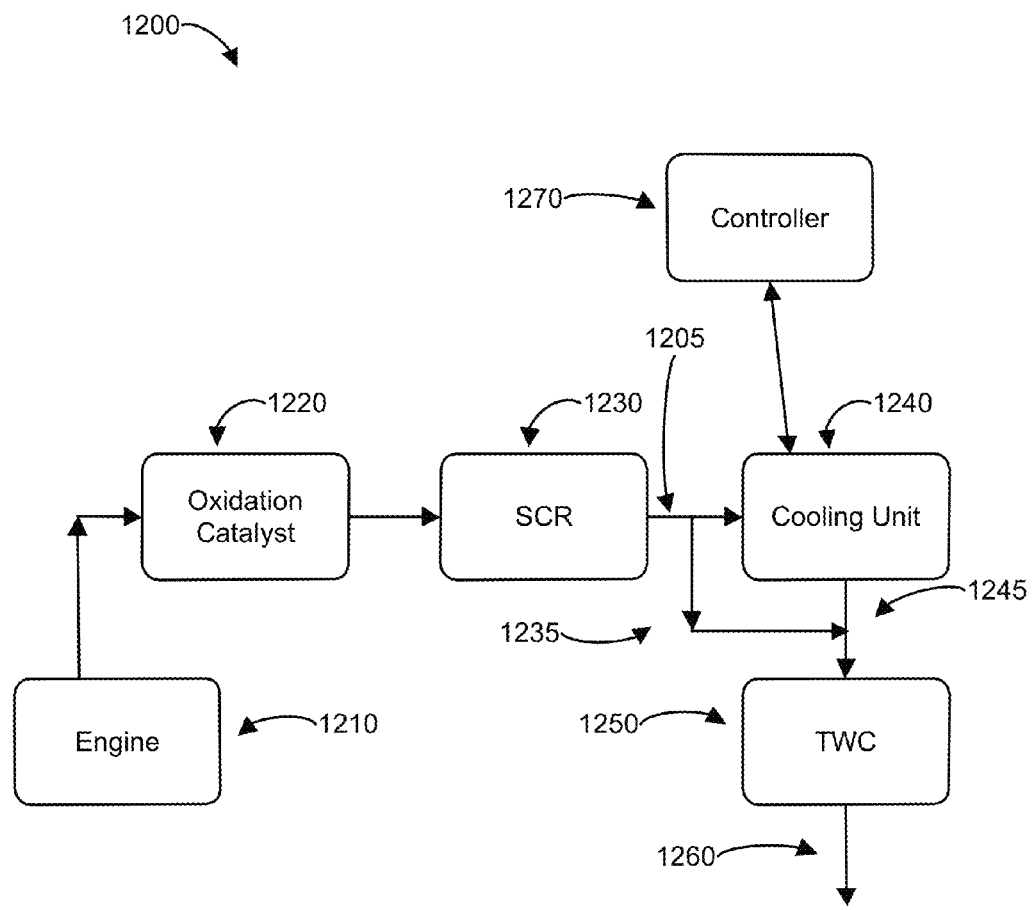
FIG. 12 is a block diagram illustrating an alternative embodiment of a system for treating exhaust from a lean-burn internal combustion engine.

FIG. 12 is a block diagram illustrating an alternative embodiment of the system 1200 of FIG. 10. The system 1200 includes a lean-burn internal combustion engine 1210, an oxidation catalytic converter 1220, a SCR 1230, a bypass conduit 1235, a cooling unit 1240, and a TWC 1250. The bypass conduit 1235 is in fluid communication with the SCR 1230 and the TWC 1250. Prior to entering the cooling unit 1240, a portion of the uncooled exhaust stream 1205 is diverted into the bypass conduit 1235. In some embodiments, the bypass conduit is the same or similar to the exhaust bypass 64 or 28 as described above.

The uncooled and cooled exhaust streams are recombined in a conduit 1245 that extends from the cooling unit 1240 to the TWC 1250. A mixing valve can be disposed in the conduit 1245 at the junction of the uncooled and cooled exhaust streams to adjust a flow rate of one or both exhaust stream so that the recombined mixed exhaust stream has a reduced temperature Tmix, which can be between about 475° F. to about 640° F. The mixing valve can be the same as or similar to the mixing valve 72 or the temperature control valve 36 described above. Tmix can be selected to optimize the selected to optimize the removal of ammonia from the combined exhaust stream. In order to achieve a Tmix of about 475° F. to about 640° F., the cooled exhaust stream is cooled to a temperature less than 475° F. to about 640° F. For example, the cooled exhaust stream can be cooled to about 280° F. as described above. Other temperatures of the cooled exhaust stream will be apparent to those skilled in the art, such as between about 250° F. to about 350° F., or a temperature therein such as 275° F., 300° F., or 325° F. In this context, the term about means +/−10% or +/−5% of the temperature.

In some embodiments, the bypass conduit 1235 is connected to a first output of the SCR 1230 and a second conduit extends from a second output of the SCR 1230 to the cooling unit 1240. The uncooled exhaust passes through the bypass conduit 1235 while the exhaust in the second conduit will be cooled by the cooling unit 1240. In some embodiments, a microprocessor-based controller 1270 is in communication with the mixing valve to adjust a flow rate of at least one of the cooled and uncooled exhaust streams to control Tmix. The controller 1270 can also be in communication with the cooling unit 1270, for example to adjust the amount of cooling applied to the exhaust stream and, thus, the output temperature of same. In some embodiments, a thermocouple is disposed in the conduit 1245 downstream of the mixing valve to measure Tmix to provide feedback to the controller 1270. In some embodiments, a sensor may be disposed downstream of the TWC 1250 (e.g., in exhaust output conduit 1260) to provide feedback to the controller 1270 on the measured ammonia concentration in the exhaust exiting the TWC 1250. In addition, feed forward sensors and controls can be used. For example, a flow rate and/or temperature sensor can be disposed in the cooled and/or uncooled exhaust streams to provide a feed forward signal to the controller 1250.

Figure 13:
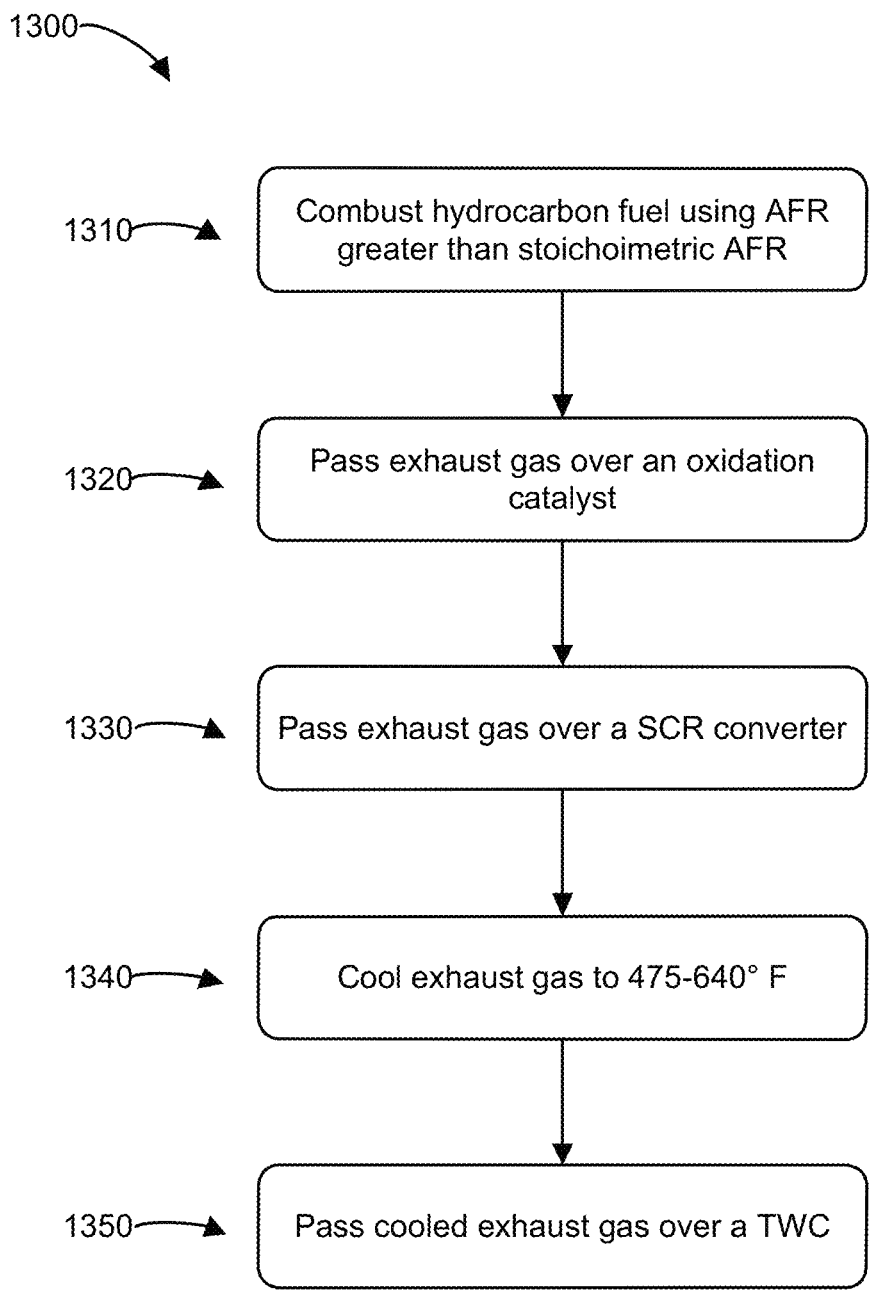
FIG. 13 is a flow chart of a method for reducing ammonia in exhaust gas.

FIG. 13 is a flow chart 1300 of a method for reducing ammonia in exhaust gas. The method includes 1310 combusting a hydrocarbon fuel using an air to fuel ratio (AFR) greater than a stoichiometric AFR needed for a complete combustion of the fuel. Such combustion can take place in a lean burn internal combustion engine, such as a spark ignited, internal combustion engine, a diesel engine, or a turbine/microturbine as described above. The fuel can be hydrocarbon based, such as diesel, gasoline, natural gas, propane, or the like. In 1320, the exhaust gas is passed over an oxidation catalyst. The oxidation catalyst can oxidize CO in the exhaust gas to form $CO_2$ as described above. In 1330, the exhaust gas is passed over a SCR converter. The SCR converter employs a reducing agent, such as ammonia, to selectively reduce NOx compounds in the exhaust gas to form $N_2$ and $H_2O$. In 1340, the oxidized and reduced exhaust gas is cooled to between about 475° F. to about 640° F. The cooling can occur in a cooling unit such as a heat exchanger, a series of cooling coils, a water injector, a cooling vaporization facility, an air injector, or the like. In 1350, the cooled exhaust is passed over a TWC catalyst. The TWC can remove or reduce the concentration of ammonia in the cooled exhaust.

Figure 14:
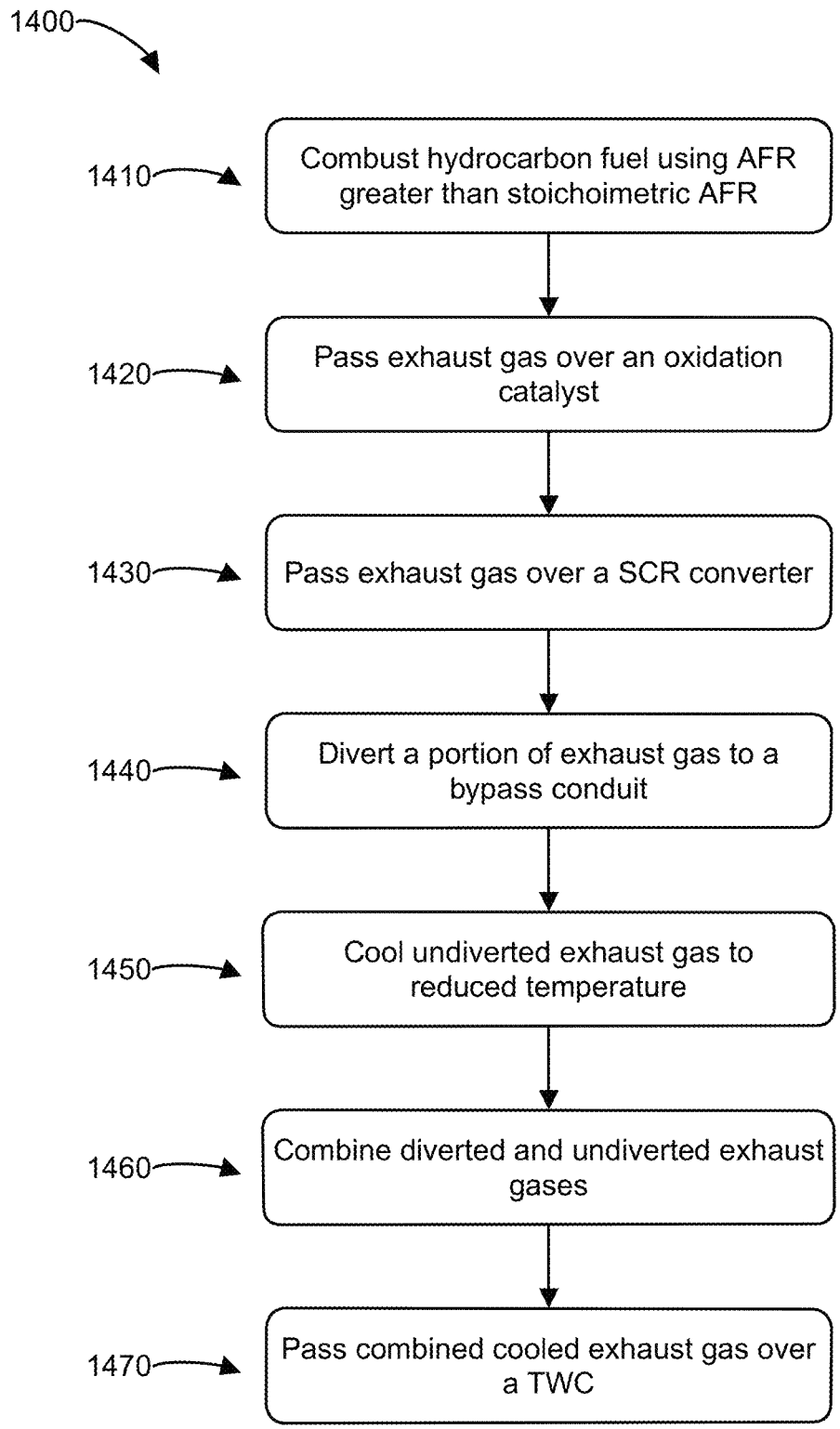
FIG. 14 is a flow chart of a method for reducing ammonia in exhaust gas according to another embodiment.

FIG. 14 is a flow chart 1400 of a method for reducing ammonia in exhaust gas according to another embodiment. 1410, 1420, and 1430 generally correspond to 1310, 1320, and 1330 as discussed above. In 1440, a portion of the exhaust gas passed over the SCR converter is diverted to a bypass conduit. The undiverted exhaust gas is cooled to a reduced temperature in 1450. The cooling can occur in a cooling unit such as a heat exchanger, a series of cooling coils, a water injector, a cooling vaporization facility, an air injector, or the like as discussed above. In 1460, the diverted and undiverted exhaust gases are controllably combined so that the resulting temperature Tmix of the combined exhaust gas is between about 475° F. to about 640° F. In 1470, the combined exhaust gas is passed over a TWC to reduce a concentration of ammonia in the combined exhaust gas.

Therefore, systems and methods for treating ammonia in exhaust gas are described. The system includes an oxidation catalyst, a SCR, a cooling unit, and a TWC. The oxidation catalyst is in fluid communication with a lean burn internal combustion engine. The SCR is in fluid communication with the oxidation catalyst and the cooling unit. The cooling unit, in turn, is in fluid communication with the SCR and the TWC.

In operation, exhaust generated by an internal combustion engine passes over the oxidation catalyst, which oxidizes CO to form $CO_2$. The oxidized exhaust then passes through a SCR, which reduces NOx compounds to form $N_2$ and $H_2O$. The exhaust is then cooled to between about 475° F. to about 640° F. in the cooling unit. The cooled exhaust then passes over the TWC, which causes at least some ammonia in the cooled exhaust to react to form a more environmentally-friendly compound(s), such as $N_2$ and $H_2O$.

In some embodiments, some of the exhaust is diverted around the cooling unit and is recombined with the cooled exhaust between the cooling unit and the TWC so that the mixed exhaust has a temperature of about 475° F. to about 640° F. The cooled exhaust, therefore, is cooled to a lower temperature than the desired temperature of the mixed exhaust. For example, the cooled exhaust can be cooled to between about 250° F.-300° F.

It is to be understood that the present invention is by no means limited to the particular constructions and method steps herein disclosed and/or shown in the drawings, but also comprises any modification or equivalent within the scope of the claims. For example, the systems and methods described with respect to FIGS. 10-14 can be modified consistent with the disclosure, for example by incorporating one or more elements of the systems and methods described with respect to FIGS. 4, 4A, 8, and 8A, and vice versa.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method of operating a catalytic system for reducing emissions of ammonia from a lean burn internal combustion engine, the method comprising:
   combusting a hydrocarbon fuel in an internal combustion engine having an air to fuel ratio (AFR) greater than a stoichiometric AFR needed for a complete combustion of said fuel;
   passing an exhaust gas generated from said engine over an oxidation catalyst, said oxidation catalyst configured to oxidize CO in said exhaust gas to form $CO_2$;
   passing said oxidized exhaust gas over a selective catalytic reduction (SCR) converter to form an oxidized and reduced exhaust gas, said SCR converter configured to reduce NOx in said oxidized exhaust gas to form N2 and $O_2$;
   cooling said oxidized and reduced exhaust gas to a temperature of 475-640° F.; and
   passing said cooled exhaust gas over a three-way catalyst to reduce a concentration of $NH_3$ in said cooled exhaust gas.

2. The method of claim 1, wherein said cooling comprises diverting a portion of said oxidized and reduced exhaust gas to bypass said cooling.

3. The method of claim 2, wherein said cooling further comprises:
   cooling an undiverted exhaust gas to between 250° F. and 350° F.; and
   combining said diverted exhaust gas and said cooled undiverted exhaust gas to form a combined exhaust gas having said temperature of 475-640° F.

4. The method of claim 3, further comprising controlling a flow rate of at least one of said diverted and cooled undiverted exhaust gases.

5. The method of claim 4, wherein said flow rate is adjusted to control said temperature of said combined exhaust gas.

6. The method of claim 5, further comprising:
   receiving a signal representing a temperature Tmix of said combined exhaust gas; and
   adjusting said flow rate based on said signal.

7. The method of claim 5, further comprising:
   receiving a signal representing an ammonia concentration in an output exhaust from said three-way catalyst; and
   adjusting said flow rate based on said signal.

8. The method of claim 5, further comprising:
   receiving a signal representing a temperature or a flow rate of said exhaust from said engine; and
   adjusting said flow rate based on said signal.

9. A method of reducing a concentration of ammonia in exhaust gas, the method comprising:
   cooling an output gas from a selective catalytic reduction converter (SCR) to a temperature of 475-640° F., said SCR catalyst using ammonia as a reducing agent, said output gas comprising a concentration of ammonia; and
   passing said cooled output gas over a three-way catalyst to reduce said concentration of said ammonia in said cooled exhaust gas.

10. The method of claim 9, wherein said cooling comprises:
    diverting a portion of said oxidized and reduced exhaust gas to bypass said cooling;
    cooling an undiverted exhaust gas to between 250° F. and 350° F.; and
    combining said diverted exhaust gas and said cooled undiverted exhaust gas to form a combined exhaust gas having said temperature of 475-640° F.

11. A system for reducing emissions of ammonia in exhaust from a lean burn internal combustion engine, the system comprising:
    an oxidation catalytic converter in fluid communication with a lean burn internal combustion engine, said oxidation catalytic converter configured to oxidize CO to form $CO_2$, said CO included in an exhaust gas generated by said internal combustion engine;
    a selective catalytic reduction converter (SCR) in fluid communication with an output of said oxidation catalytic converter, said SCR configured to reduce NOx in said oxidized exhaust gas;
    a cooling unit in fluid communication with an output of said SCR; and
    a three-way catalytic converter in fluid communication with an output of said cooling unit.

12. The system of claim 11, wherein said cooling unit is configured to lower a temperature of said exhaust gas to 475-640° F.

13. The system of claim 11 further comprising a bypass conduit configured to bypass said cooling unit.

14. The system of claim 13 further comprising a mixing valve disposed in a cooling conduit that extends from said cooling unit to said three-way catalyst, said mixing valve in fluid communication with said bypass conduit and said cooling conduit to mix a bypassed exhaust gas flowing in said bypass conduit and a cooled exhaust gas flowing in said cooling conduit.

15. The system of claim 14 further comprising a controller in communication with said mixing valve, said controller configured to adjust a flow rate of at least one of said bypassed exhaust gas and said cooled exhaust gas to control a temperature of said mixed exhaust gas.

16. The system of claim 15 further comprising a sensor configured to measure an ammonia concentration of treated exhaust gas exiting said three-way catalyst, said sensor disposed in an output conduit that extends from said three-way catalyst, said sensor in communication with said controller.

17. The system of claim 11 wherein said cooling unit comprises at least one of a heat exchanger, a plurality of cooling coils, a water injector, a cooling vaporization facility, or an air injector.

18. The system of claim 15 further comprising a thermocouple disposed in an output conduit that extends from said three-way catalyst, said thermocouple providing a temperature feedback signal to said controller.

19. The system of claim 11 wherein said engine is a turbine.

20. The system of claim 11 wherein said engine is a stationary engine configured for a combined heat and power application.

* * * * *